United States Patent [19]

Funamoto

[11] Patent Number: 5,327,124
[45] Date of Patent: Jul. 5, 1994

[54] METHOD OF SECONDARY MODULATION OF A TRAIN OF RECORDED DATA

[75] Inventor: Kyota Funamoto, Tokorozawa, Japan

[73] Assignee: Pioneer Electronic Corporation, Tokyo, Japan

[21] Appl. No.: 16,561

[22] Filed: Feb. 11, 1993

[30] Foreign Application Priority Data

May 21, 1992 [JP] Japan .................................. 4-128873

[51] Int. Cl.[5] .......................................... H03M 5/00
[52] U.S. Cl. ......................................... 341/58; 341/68; 341/52
[58] Field of Search ...................... 341/52, 55, 58, 59, 341/68, 69, 70, 71, 72

[56] References Cited

U.S. PATENT DOCUMENTS

| | | |
|---|---|---|
| 4,413,251 | 11/1983 | Adler et al. ............................ 341/59 |
| 4,617,552 | 10/1986 | Kojima et al. ......................... 341/58 |
| 4,626,826 | 12/1986 | Fukuda et al. ........................ 341/58 |
| 5,012,240 | 4/1991 | Takahashi et al. ................ 341/58 X |
| 5,047,767 | 9/1991 | Weathers et al. ..................... 341/59 |
| 5,200,979 | 4/1993 | Harris .................................... 341/58 |

Primary Examiner—Howard L. Williams
Attorney, Agent, or Firm—Sughrue, Mion, Zinn, Macpeak & Seas

[57] ABSTRACT

A secondary modulation method which replaces any bit excluding the leading bit of consecutive five or more ones in an odd-numbered bit pattern of a train of RLL-modulated data, with a zero to provide a modulated bit pattern having no consecutive zeros. It is therefore possible to form marks of a given width on a disk without any mark edge shift, thus preventing the level of the waveform of a signal read from a disk from falling below the slice level at the position where the waveform of the read signal should show "1". This can ensure the proper data reproduction.

2 Claims, 12 Drawing Sheets

FIG. 1

TABLE A

| LAST OUTPUT BIT PREVIOUSLY ENCODED | INPUT DATA BIT TRAIN NRZ DATA | | OUTPUT DATA BIT TRAIN (1,7)RLL DATA | | |
|---|---|---|---|---|---|
| | 1st | 2nd | 1st | | 3rd |
| 0 | 0 | 1 | 1 | 0 | 0 |
| 1 | 0 | 1 | 0 | 0 | 0 |
| x | 1 | 0 | 0 | 1 | 0 |
| 0 | 1 | 1 | 1 | 0 | 1 |
| 1 | 1 | 1 | 0 | 0 | 1 |

TABLE B

| LAST OUTPUT BIT PREVIOUSLY ENCODED | INPUT DATA BIT TRAIN NRZ DATA | | | | OUTPUT DATA BIT TRAIN (1,7)RLL DATA | | | | | |
|---|---|---|---|---|---|---|---|---|---|---|
| | 1st | | | 4th | 1st | | | | | 6th |
| 0 | 0 | 0 | 0 | 1 | 1 | 0 | 0 | 0 | 0 | 1 |
| 1 | 0 | 0 | 0 | 1 | 0 | 0 | 0 | 0 | 0 | 1 |
| 0 | 0 | 0 | 1 | 0 | 1 | 0 | 0 | 0 | 0 | 0 |
| 1 | 0 | 0 | 1 | 0 | 0 | 0 | 0 | 0 | 0 | 0 |
| x | 0 | 0 | 1 | 1 | 0 | 1 | 0 | 0 | 0 | 1 |
| x | 0 | 0 | 0 | 0 | 0 | 1 | 0 | 0 | 0 | 0 |

FIG. 2 (a)
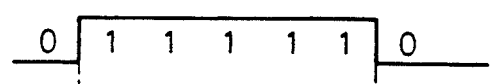
FIG. 2 (b)
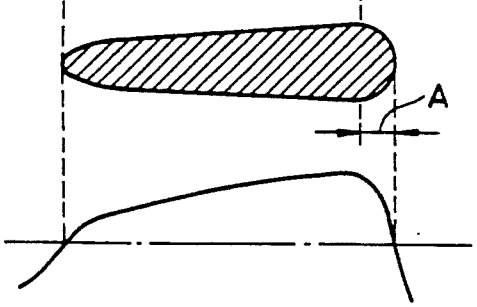
FIG. 2 (c)

FIG. 3

| NRZI PATTERN | 2T | 3T | 4T | 5T |
|---|---|---|---|---|
| NRZI DATA TRAIN | 0 1 1 0 | 0 1 1 1 0 | 0 1 1 1 1 0 | 0 1 1 1 1 1 0 |
| | 0 1 0 0 | 0 1 1 0 0 | 0 1 0 1 0 0 | 0 1 0 0 1 0 0 |

↖ SECONDARY-MODULATED DATA TRAIN

| NRZI PATTERN | 6T | 7T |
|---|---|---|
| NRZI DATA TRAIN | 0 1 1 1 1 1 1 0 | 0 1 1 1 1 1 1 1 0 |
| | 0 1 0 1 0 1 0 0 | 0 1 0 1 0 0 1 0 0 |

↖ SECONDARY-MODULATED DATA TRAIN

| NRZI PATTERN | 8T |
|---|---|
| NRZI DATA TRAIN | 0 1 1 1 1 1 1 1 1 0 |
| | 0 1 0 1 0 1 0 1 0 0 |

↖ SECONDARY-MODULATED DATA TRAIN

FIG. 8

| NRZI PATTERN | 2T | 3T | 4T | 5T |
|---|---|---|---|---|
| NRZI DATA TRAIN | 0 1 1 0 | 0 1 1 1 0 | 0 1 1 1 1 0 | 0 1 1 1 1 1 0 |
| SECONDARY-MODULATED DATA TRAIN | 0 1 0 0 | 0 1 1 0 0 | 0 1 0 1 0 0 | 0 1 1 0 1 0 0 |
| GROUP CODE  MSB | -0 - - | -0 1 - | -0 -0 - | -0 1 -0 - |
| GROUP CODE  LSB | -0 - - | -1 0 - | -0 -0 - | -1 0 -0 - |

| NRZI PATTERN | 6T | 7T |
|---|---|---|
| NRZI DATA TRAIN | 0 1 1 1 1 1 1 0 | 0 1 1 1 1 1 1 1 0 |
| SECONDARY-MODULATED DATA TRAIN | 0 1 0 1 0 1 0 0 | 0 1 0 1 1 0 1 0 0 |
| GROUP CODE  MSB | -0 -0 -0 - - | -0 -0 1 -0 - - |
| GROUP CODE  LSB | -0 -0 -0 - - | -0 -0 -1 0 - - |

| NRZI PATTERN | 8T |
|---|---|
| NRZI DATA TRAIN | 0 1 1 1 1 1 1 1 1 0 |
| SECONDARY-MODULATED DATA TRAIN | 0 1 0 1 0 1 0 1 0 0 |
| GROUP CODE  MSB | -0 -0 -0 -0 - - |
| GROUP CODE  LSB | -0 -0 -0 -0 - - |

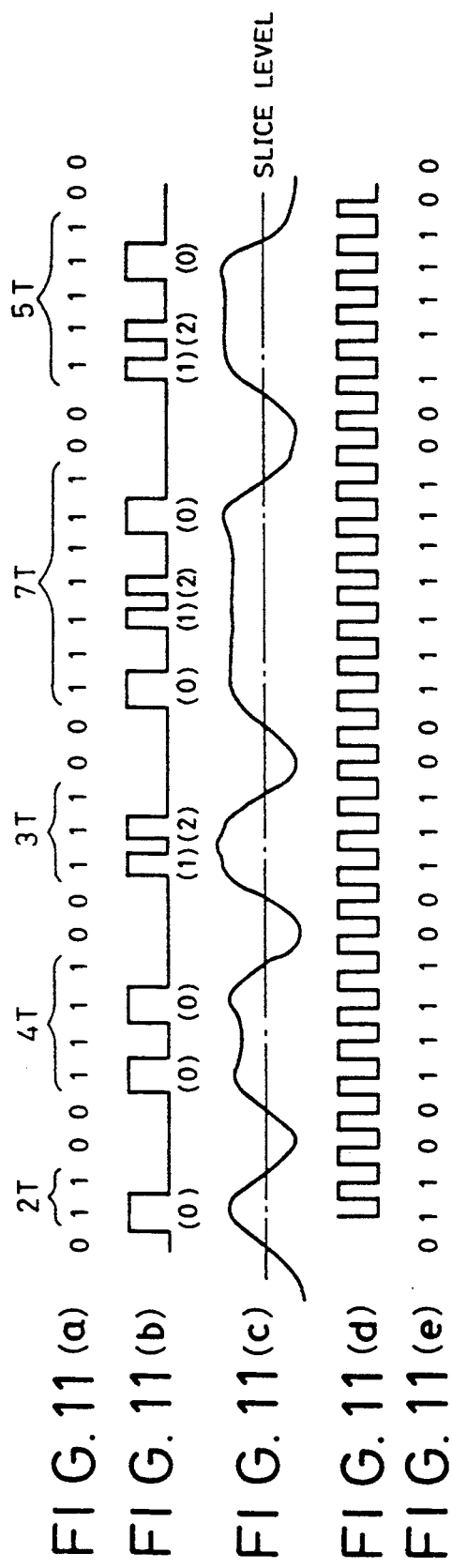

| NRZI PATTERN | | | | |
|---|---|---|---|---|
| NRZI DATA TRAIN | 0 | 1 | 1 | 0 |
| Secondary-modulated data train | 0 | 1 | 0 | 0 |
| GROUP CODE MSB | – | – | 0 | – |
| GROUP CODE LSB | – | – | 0 | – |

3T

| NRZI PATTERN | | | | | |
|---|---|---|---|---|---|
| NRZI DATA TRAIN | 0 | 1 | 1 | 1 | 0 |
| Secondary-modulated data train | 0 | 1 | 1 | 0 | 0 |
| GROUP CODE MSB | – | – | 0 | 0 | – |
| GROUP CODE LSB | – | – | 1 | 1 | – |

4T

| NRZI PATTERN | | | | | | |
|---|---|---|---|---|---|---|
| NRZI DATA TRAIN | 0 | 1 | 1 | 1 | 1 | 0 |
| Secondary-modulated data train | 0 | 1 | 0 | 1 | 0 | 0 |
| GROUP CODE MSB | – | – | 0 | – | 0 | – |
| GROUP CODE LSB | – | – | 0 | – | 0 | – |

5T

| NRZI PATTERN | | | | | | | |
|---|---|---|---|---|---|---|---|
| NRZI DATA TRAIN | 0 | 1 | 1 | 1 | 1 | 1 | 0 |
| Secondary-modulated data train | 0 | 1 | 1 | 1 | 1 | 0 | 0 |
| GROUP CODE MSB | – | – | 0 | 1 | 1 | 0 | – |
| GROUP CODE LSB | – | – | 0 | 0 | 0 | 0 | – |

6T

| NRZI PATTERN | | | | | | | | |
|---|---|---|---|---|---|---|---|---|
| NRZI DATA TRAIN | 0 | 1 | 1 | 1 | 1 | 1 | 1 | 0 |
| Secondary-modulated data train | 0 | 1 | 0 | 1 | 0 | 1 | 0 | 0 |
| GROUP CODE MSB | – | – | 0 | – | 0 | – | 0 | – |
| GROUP CODE LSB | – | – | 0 | – | 0 | – | 0 | – |

7T

| NRZI PATTERN | | | | | | | | | |
|---|---|---|---|---|---|---|---|---|---|
| NRZI DATA TRAIN | 0 | 1 | 1 | 1 | 1 | 1 | 1 | 1 | 0 |
| Secondary-modulated data train | 0 | 1 | 0 | 1 | 1 | 0 | 1 | 0 | 0 |
| GROUP CODE MSB | – | – | 0 | – | 0 | 0 | – | 0 | – |
| GROUP CODE LSB | – | – | 0 | – | 1 | 1 | – | 0 | – |

8T

| NRZI PATTERN | | | | | | | | | | |
|---|---|---|---|---|---|---|---|---|---|---|
| NRZI DATA TRAIN | 0 | 1 | 1 | 1 | 1 | 1 | 1 | 1 | 1 | 0 |
| Secondary-modulated data train | 0 | 1 | 0 | 1 | 0 | 1 | 0 | 1 | 0 | 0 |
| GROUP CODE MSB | – | – | 0 | – | 0 | – | 0 | – | 0 | – |
| GROUP CODE LSB | – | – | 0 | – | 0 | – | 0 | – | 0 | – |

METHOD OF SECONDARY MODULATION OF A TRAIN OF RECORDED DATA

BACKGROUND OF THE INVENTION

1. Field of the Invention

The present invention relates to a method of performing secondary modulation on a train of data acquired by run length limited modulation of a train of data that represents information to be recorded on a recording medium.

2. Description of the Related Art

Run length limited (hereinafter referred to as "RLL") modulation is one type of modulation to convert a train of data representing information to be recorded on a recording medium, to have a format suitable for the recording medium. A series of zeros or ones in a train of NRZ (Non Return to Zero) data is called "run", and modulation to encode input data according to conversion rules is called (d, k) RLL modulation where d is the minimum run of zeros and k is the maximum run of zeros. In (1, 7) RLL modulation, one type of a RLL modulation, NRZ data is converted in accordance with Tables A and B given in FIG. 1. If the NRZ data in the data input order matches with any 4-bit pattern in Table B, the four bits of the NRZ data are converted into six bits in accordance with the Table B. If the NRZ data in the data input order matches with none of the 4-bit patterns in Table B, every two bits of the NRZ data are converted into three bits in accordance with the Table A. When the result of the (1, 7) RLL modulation is further subject to NRZI (Non Return to Zero Inverted) conversion, a series of ones have seven NRZI patterns 2T to 8T where T represents a bit interval.

In a recording medium, such as a magneto optical disk or a write once optical disk, on which recording marks (or pits) are formed on the recording surface by a temperature rise caused by a focused laser beam at the time of information recording, if the mark length becomes long even with constant write power of the laser beam, heat energy is accumulated in the recording medium so that the mark width gradually increases and a mark edge shift occurs. For example, if five consecutive bits in a data train are all ones, when constant write power is generated as shown in FIG. 2(a), a mark is formed on the recording medium as shown in FIG. 2(b). The position of the mark which corresponds to the trailing edge of the data where "1" changes to "0" in FIG. 2(a) is shifted, producing a mark edge shift A. When a signal is read out from a portion of the recording medium having such a mark, the read signal would have a waveform as shown in FIG. 2(c) so that the waveform above the slice level contains the mark edge shift A, preventing the reproduction of the original data.

Heretofore, to overcome such a shortcoming, write power at the time of irradiating a laser beam has been controlled in order to form marks of a given width without any mark edge shift. Alternatively, when (1, 7) RLL modulation and NRZI conversion are employed as the first modulation as described above, the NRZI patterns 2T to 8T are converted by the secondary modulation as shown in FIG. 3 to write a signal resulting from the secondary modulation on the recording medium.

However, to control the write power at the time of irradiating a laser beam requires different power controls for the different patterns, making the structure of the power controller very complicated. If the above secondary modulation is carried out, when "11111" is converted to "10010", for example, for an odd-numbered pattern of 5T or more, the level of a read signal corresponding to the pattern portion in the recording area at the outer periphery side of the disk where the recording density gets lower drops below the slice level as shown in FIG. 4, the signal cannot be demodulated to "11111" at the individual bit discrimination positions (points of the arrows).

SUMMARY OF THE INVENTION

It is therefore an object of the present invention to provide a method of forming marks of a given width on a disk without any mark edge shift and without requiring write-power control at the time of irradiating a laser beam, and performing secondary modulation on a train of data RLL-modulated in such a way that a read signal corresponding to an odd-numbered pattern of the RLL-modulated data train of 5T or more has a level equal to or above a slice level.

According to the present invention, there is provided a method of performing secondary modulation on a train of data RLL-modulated to be recorded on a recording medium, which method comprises a step of replacing any bit excluding the leading bit of consecutive five or more ones in an odd-numbered bit pattern of the train of data, with a zero to provide a modulated bit pattern having no consecutive zeros.

BRIEF DESCRIPTION OF THE DRAWINGS

FIG. 1 shows conversion tables used in (1, 7) RLL modulation;

FIG. 2 is a diagram illustrating conventional formation of a mark and the waveform of a read signal;

FIG. 3 shows trains of data resulting from conventional secondary modulation;

FIG. 8 shows the relationship between inputs and outputs for a secondary modulation conversion table and a group code conversion table;

FIG. 11 is a diagram showing the waveform of a read signal and a train of read data with respect to a train of NRZI data; and FIG. 12 shows another example of the relationship between inputs and outputs for the secondary modulation conversion table and group code conversion table.

DETAILED DESCRIPTION OF THE PREFERRED EMBODIMENT

Figure 4:
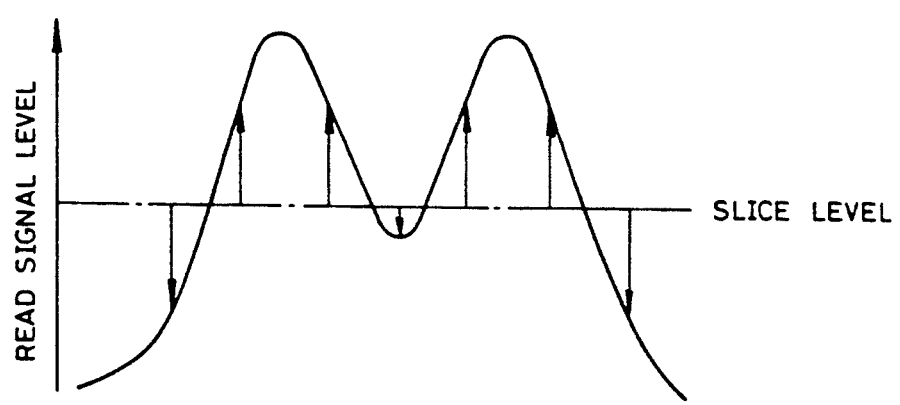
FIG. 4 is a diagram showing the waveform of a read signal with respect to a slice level.
Figure 5:
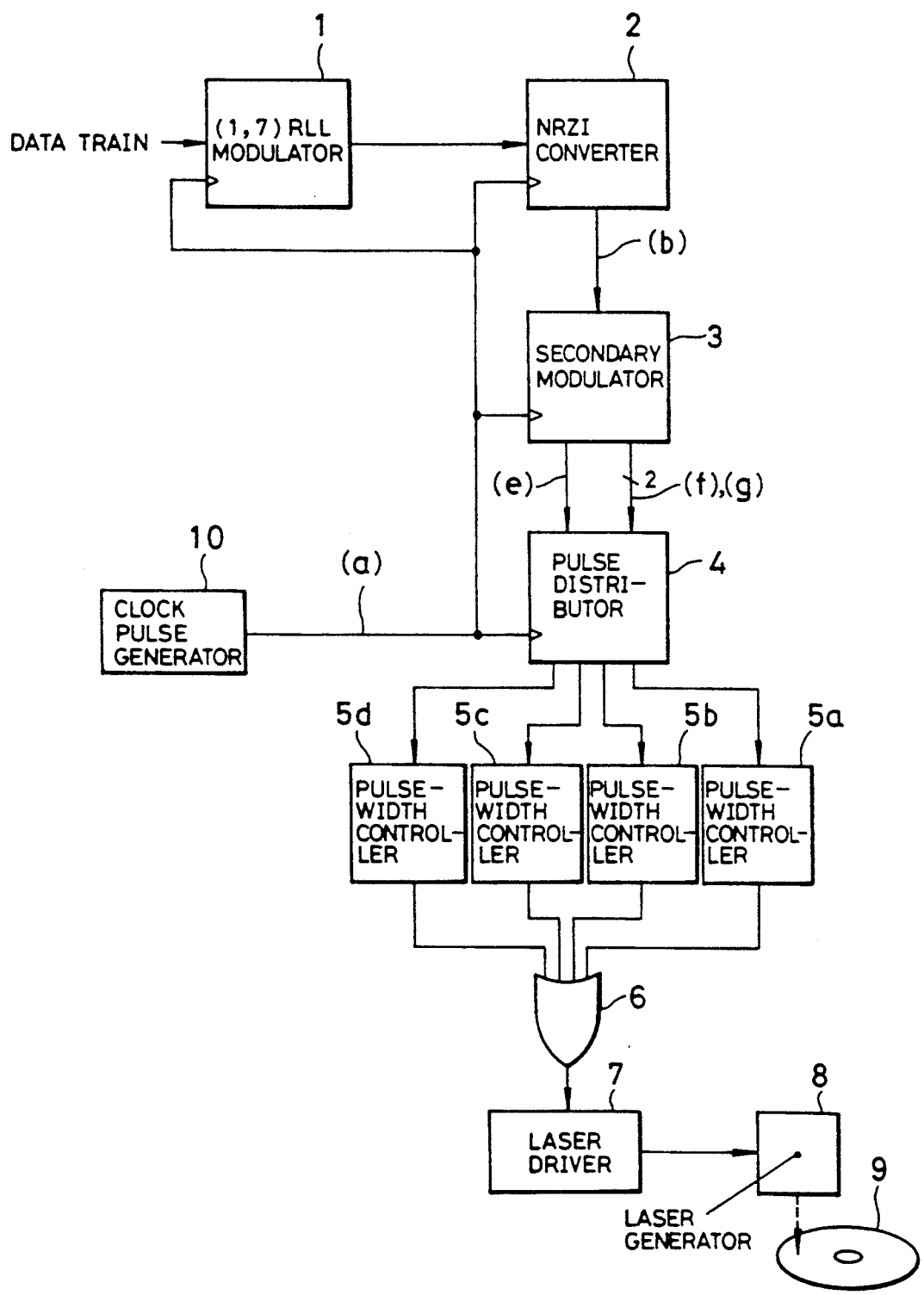
FIG. 5 presents a block diagram illustrating a write signal generating system to which the secondary modulation of the present invention is applied.

A preferred embodiment of the present invention will now be described in detail referring to the accompanying drawings. FIG. 5 illustrates a write signal generating system to which the secondary modulation of the present invention is applied. In this system, a train of input NRZ data is supplied to a (1, 7) RLL modulator 1. The (1, 7) RLL modulator 1 is a logic circuit which performs code conversion according to the rules given in FIG. 1. The output of the (1, 7) RLL modulator 1 is connected to an NRZI converter 2, which supplies its output, a train of NRZI-converted data to a secondary modulator 3. The secondary modulator 3 has a structure (to be described later) to produce secondary-modulated data from the supplied data train and output the data together with 2-bit group data indicating the type of the modulation in a serial form. The output of the secondary modulator 3 is connected to a pulse distributor 4. The pulse distributor 4 supplies the secondary-modulated data and group data to one of four pulse-width controllers 5a to 5d. Each of the pulse-width controllers 5a to 5d shortens or expands the width of that part of the input data from the pulse distributor 4 which corresponds to "1". The outputs of the individual pulse-width controllers 5a to 5d are supplied to an OR gate 6 to yield their logical sum, which is then supplied to a laser driver 7. An output signal of the laser driver 7 is supplied to a laser generator 8, which irradiates a laser beam on a disk 9 in synchronism with bits of "1" of the supplied signal. The movement of the laser generator 8 in the radial direction of the disk and the rotation of the disk 9 are controlled by a driver mechanism (not shown). Servo controls including the focusing servo control and tracking servo control for the laser generator 8 are executed by a circuit (not shown).

A clock pulse generator 10 supplies a clock pulse to the (1, 7) RLL modulator 1, NRZI converter 2, secondary modulator 3 and pulse distributor 4. The (1, 7) RLL modulator 1 receives an input train of NRZ data having ⅔ of the frequency of the clock pulse and sends out its output in synchronism with the clock pulse.

Figure 6:
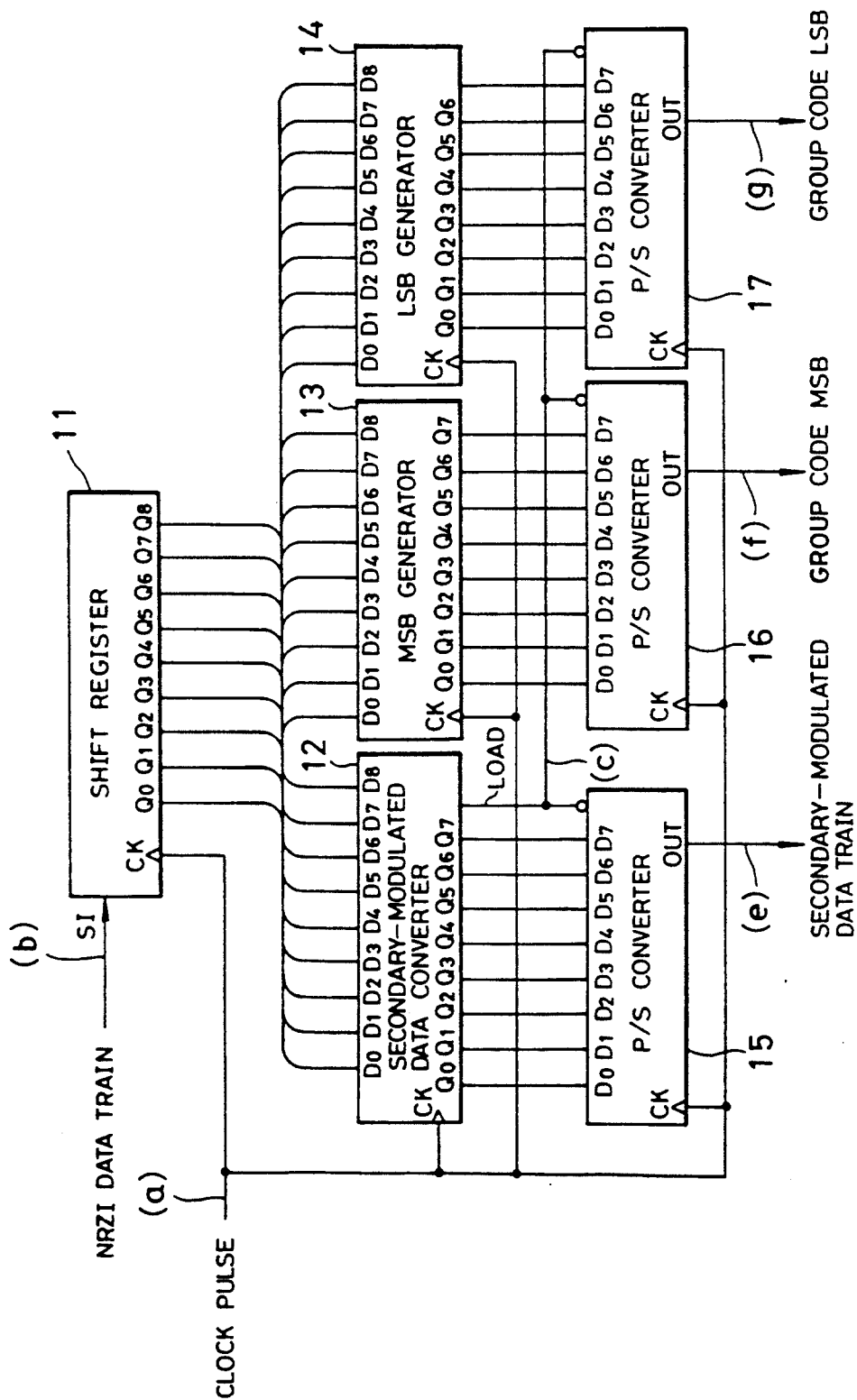
FIG. 6 is a block diagram showing a specific structure of a secondary modulator in the system in FIG. 5.

The secondary modulator 3 includes a 9-bit shift register 11 which receives a train of data from the NRZI converter 2 as shown in FIG. 6. The shift register 11 has output terminals $Q_0$ to $Q_8$ corresponding to the individual bits. The shift register 11 receives the input data train at its input terminal SI and outputs the data in parallel from the output terminals $Q_0$ to $Q_8$, both in synchronism with the clock pulse. Those output terminals $Q_0$ to $Q_8$ are connected to a secondary-modulated data converter 12, a group code MSB generator 13 and a group code LSB generator 14. The secondary-modulated data converter 12 comprises a memory having secondary modulation conversion tables that are respectively associated with seven types of patterns 2T to 8T in NRZI-converted data which has a series of ones. The group code MSB generator 13 comprises a memory having group code MSB conversion tables that are respectively associated with the seven types of patterns 2T to 8T, while the group code LSB generator 14 comprises a memory having group code LSB conversion tables respectively associated with the seven types of patterns 2T to 8T. Each of the converter 12 and generator 13 and 14 converts data supplied at its input terminals $D_0$ to $D_8$ according to the proper conversion table and outputs the result from its output terminals $Q_0$ to $Q_7$, in response to the output from the output terminal $Q_8$ of the shift register 11. In the case of "11" in the pattern 2T, for instance, when the leading bit is output from the output terminal $Q_8$ of the shift register 11, the secondary-modulated data converter 12 outputs "00000001", the result of the secondary modulation conversion for the pattern 2T, from the output terminals $Q_0$ to $Q_7$, and even if the shift register 11 has output data representing "1" from the output terminals $Q_0$ to $Q_5$ in accordance with a pattern following the 2T pattern, it is ignored. The secondary-modulated data converter 12 generates a load signal only during one clock cycle from the point of inversion of the output at the output terminal $Q_8$ of the shift register from "0" to "1".

The output terminals $Q_0$ to $Q_7$ of the secondary-modulated data converter 12, group code MSB generator 13 and group code LSB generator 14 are connected to parallel/serial (P/S) converters 15 to 17, respectively. Each of the P/S converters 15 to 17 receives the 8-bit parallel data from the input terminals $D_0$ to $D_7$ and holds it upon reception of the load signal, and outputs the holding data from an output terminal OUT in serial form from upper bits in synchronism with the clock pulse when the supply of the load signal is stopped.

Figure 7:
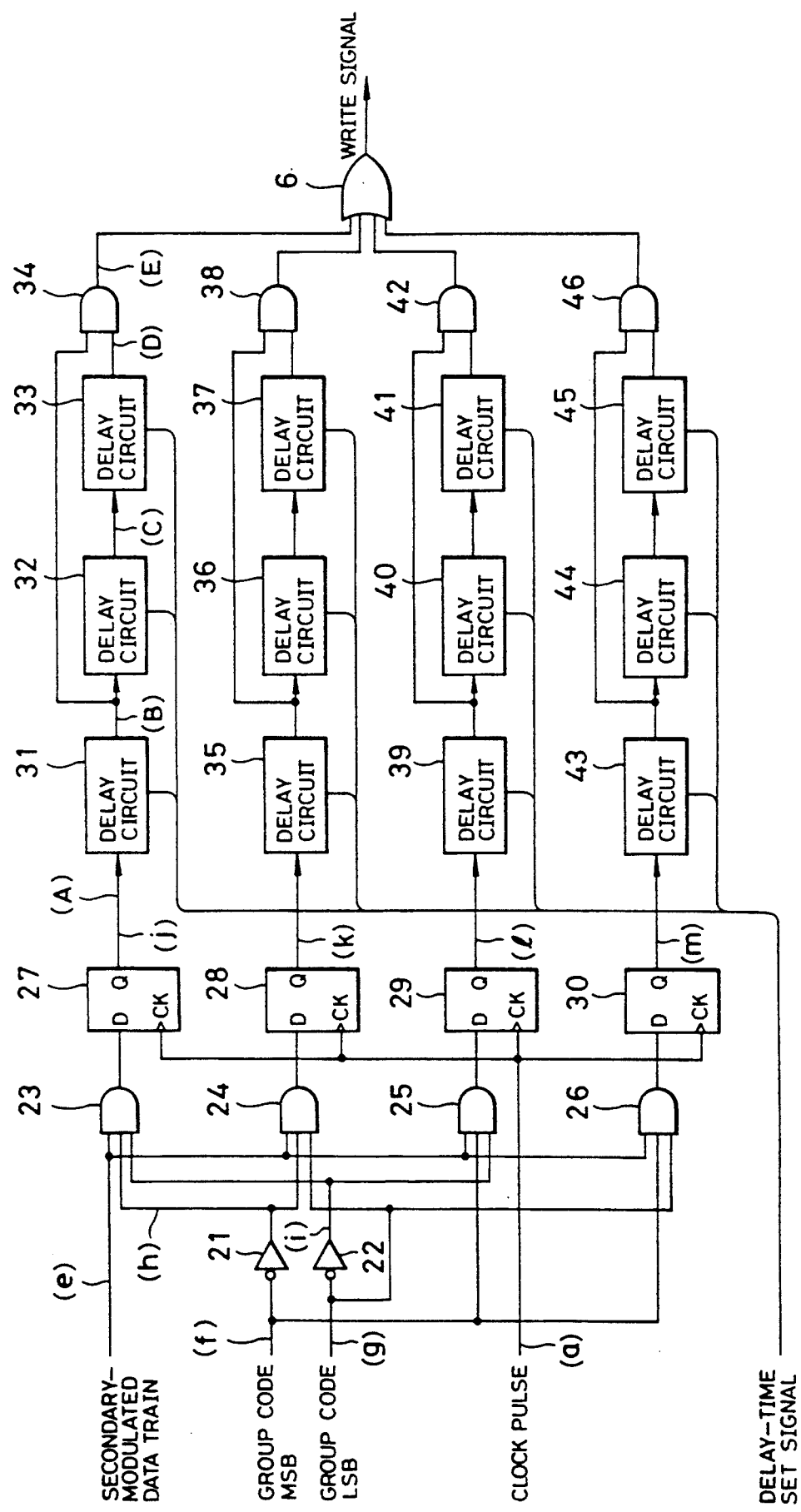
FIG. 7 is a block diagram showing specific structures of a pulse distributor and pulse-width controllers in the system in FIG. 5.

Specific structures of the pulse distributor 4 and the pulse-width controllers 5a to 5d will be described below referring to FIG. 7. As shown in FIG. 7, the pulse distributor 4 comprises inverters 21 and 22, 3-input AND gates 23 to 26 and D flip-flops 27 to 30. The inverter 21 receives a group code MSB signal from the P/S converter 16, and the inverter 22 receives a group code LSB signal from the P/S converter 17. The first input of each of the AND gates 23 to 26 is supplied with a train of secondary-modulated data from the P/S converter 15. The second inputs of both AND gates 23 and 24 are supplied directly with the output code of the inverter 21, while the second inputs of both AND gates 25 and 26 are supplied directly with the group code MSB signal from the P/S converter 16. The third inputs of both AND gates 23 and 25 are supplied directly with the output code of the inverter 22, while the third inputs of both AND gates 24 and 26 are supplied directly with the group code LSB signal from the P/S converter 17. The outputs of the AND gates 23 to 26 are supplied to input terminals D of the respective flip-flops 27 to 30. The flip-flops 27 to 30 each have a clock input terminal CK which is supplied with a clock pulse. The output terminals Q of the flip-flops 27–30 respectively serve as the output terminals of the pulse distributor 4.

The pulse-width controller 5a comprises three delay circuits 31 to 33 and an AND gate 34. The delay circuits 31 to 33 have delay characteristics that are set in accordance with externally set signals, and are connected in series to the output terminal Q of the flip-flop 27. The AND gate 34 obtains a logical product of the individual output signals of the delay circuits 31 and 33. The delay time of the delay circuit 31 is externally set to K-a sec, the delay time of the delay circuit 32 to a sec, and the delay time of the delay circuit 33 to b sec, where K is a fixed value and a and b are variables that vary with an externally set signal. For instance, K=3 sec, a=2 sec and b=1 sec. The pulse-width controllers 5b to 5d are designed similarly; the pulse-width controller 5b comprises three delay circuits 35 to 37 and an AND gate 38, the pulse-width controller 5c comprises three delay circuits 39 to 41 and an AND gate 42, and the pulse-width controller 5d comprises three delay circuits 43 to 45 and an AND gate 46.

The delay time of the delay circuit 35 is externally set to K-c sec, the delay time of the delay circuit 36 to c sec, the delay time of the delay circuit 37 to d sec, the delay time of the delay circuit 39 to K-e sec, the delay time of the delay circuit 40 to e sec, the delay time of the delay circuit 41 to f sec, the delay time of the delay circuit 43 to K-g sec, the delay time of the delay circuit 44 to g sec, and the delay time of the delay circuit 45 to h sec. Here, c to h, like a and b, are variables that vary with an externally set signal. The output signals of the AND gates 34, 38, 42 and 46 are supplied to the OR gate 6.

With the above structure, a train of input NRZ data is converted into a (1, 7) RLL data train in the (1, 7) RLL modulator 1 in accordance with the Table A or B shown in FIG. 1, and the (1, 7) RLL data train is further subjected to NRZI conversion in the NRZI converter 2 to be a train of NRZI data, as in the prior art. The NRZI data train has seven patterns 2T to 8T for a series of ones as shown in FIG. 3. The (1, 7) RLL modulator 1 receives NRZ data at ⅔ of the frequency of the clock pulse and outputs (1, 7) RLL data train at the frequency of the clock pulse, though not described in the foregoing description of the prior art.

The NRZI data train output from the NRZI converter 2 is serially supplied to the shift register 11 in synchronism with the clock pulse, and is output in parallel from the output terminals $Q_0$ to $Q_8$ thereof.

FIG. 8 shows the relationship between inputs and outputs determined by the individual conversion tables in the secondary-modulated data converter 12, group code MSB generator 13 and group code LSB generator 14 to which the NRZI data train is supplied in parallel. For even-numbered patterns, after the secondary modulation conversion, every "11" is converted into "10". For the patterns 3T and 5T in odd-numbered patterns, the first "111" is converted into "110", and the remaining "11" in the pattern 5T is converted into "10". For the pattern 7T, the first "11" is converted into "10", and the subsequent "111" into "110" while the remaining "11" is converted into "10". In generating a group code, group codes MSB and LSB are both set to "0" for the leading bit of the portion whose "11" has been converted into "10", and group codes MSB and LSB are respectively set to "01" and "10" for the first two bits of the portion whose "111" has been converted into "110". The group code pair (MSB, LSB)=0, 0 indicates the first group, (MSB, LSB)=0, 1 the second group, and (MSB, LSB)=1, 0 the third group. The group code marked with "-" indicates that it is specified by neither "0" nor "1".

Figure 9:
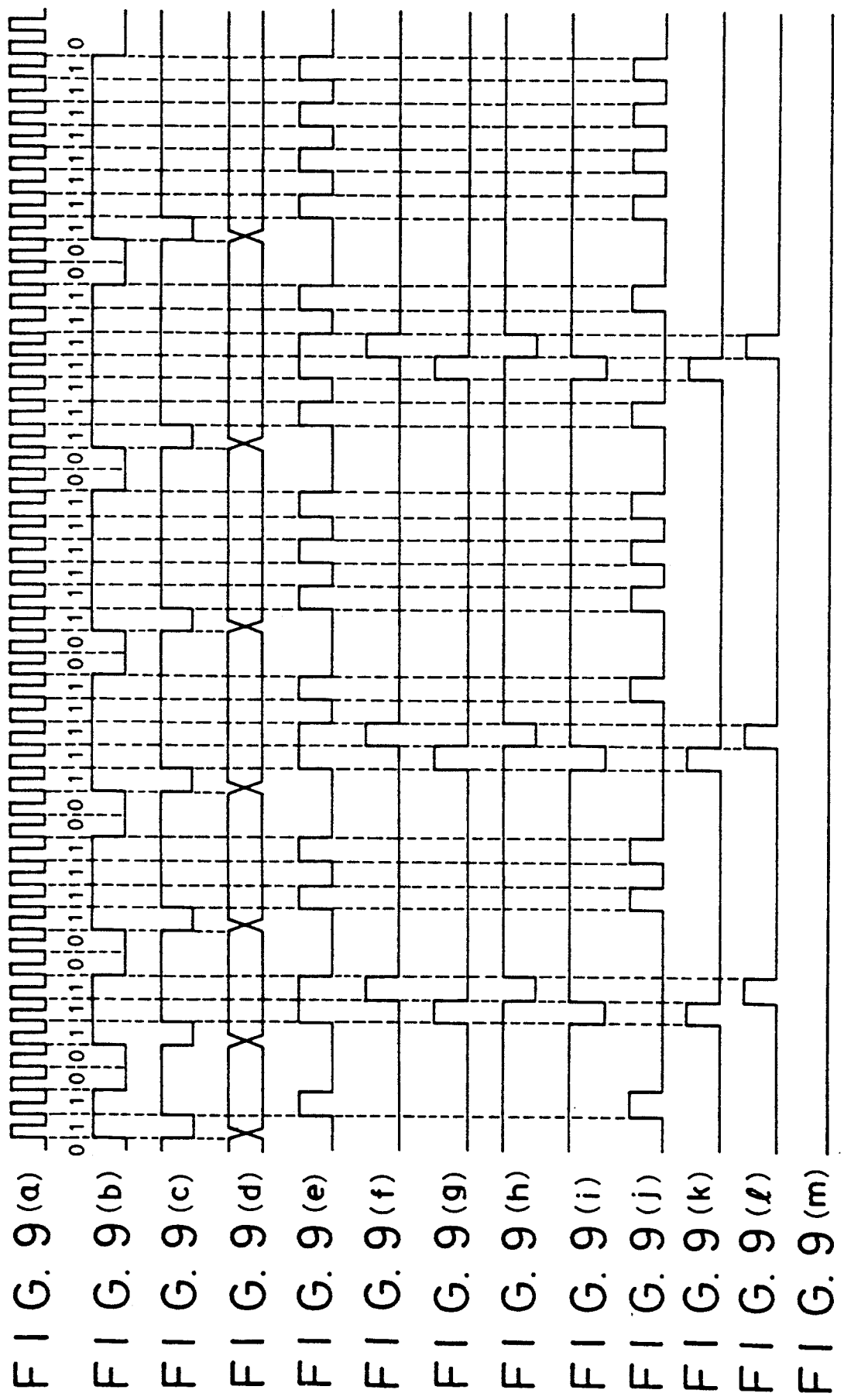
FIG. 9 is a chart showing the operational waveforms of individual sections in the system in FIG. 5.

FIG. 9 shows the operational waveforms of individual sections in this system. The pulse in FIG. 9(a) is a clock pulse. It is to be noted that in synchronism with this clock pulse, NRZI data train is supplied to the shift register 11 and the NRZI data train is output from the output terminal $Q_8$ of the shift register 11 as shown in FIG. 9(b). The secondary-modulated data converter 12 generates the load signal in one clock cycle in synchronism with the inversion of the output from the output terminal $Q_8$ to "1" from "0" as shown in FIG. 9(c). The train of data output from the secondary-modulated data converter 12 during the generation of the load signal is a train of secondary-modulated data which has been resulted from the conversion for a pattern having a series of ones. Likewise, the data output from the group code MSB generator 13 and group code LSB generator 14 during the generation of the load signal are the results of the group code conversion for a pattern having a series ones. Even when the load signal disappears, the data representing the conversion result from the output terminals $Q_0$ to $Q_7$ of each of the secondary-modulated data converter 12, group code generator MSB generator 13 and group code LSB generator 14 remains the same as the conversion result acquired during the generation of the load signal, as shown in FIG. 9(d). In accordance with the disappearance of the load signal, each of the P/S converters 15 to 17 outputs the holding data in serial form in order from the bit corresponding to the input terminal $D_7$ in synchronism with the clock pulse. Thus, the secondary-modulated data train is output as shown in FIG. 9(e), the group code MSB is output as shown in FIG. 9(f), and the group code LSB is output as shown in FIG. 9(g).

In the pulse distributor 4, the group code MSB is inverted as shown in FIG. 9(h) by the inverter 21, and the group code LSB is inverted as shown in FIG. 9(i) by the inverter 22. When secondary-modulated data train for any of the even-numbered patterns 2T, 4T and 8T indicates "1", the group codes MSB and LSB are both "0" so that the output levels of the inverters 21 and 22 both show "1". Therefore, the output of the AND gate 23 indicates "1" and the outputs of the AND gates 24 to 26 all indicate "0". As a result, the output signal of the flip-flop 27 becomes a high level pulse indicating "1" as shown in FIG. 9(j) in synchronism with the clock pulse while the output levels of the flip-flops 28 to 30 remain a low level indicating "0" as shown in FIG. 9(k) to FIG. 9(m). The output pulse of the flip-flop 27 is supplied to the pulse-width controller 5a.

When the secondary-modulated data train for the pattern 3T is supplied to the pulse distributor 4, at the first "1" in the two consecutive ones in the secondary-modulated data train, the group code MSB is "0" and the group code LSB is "1", so that the output level of the inverter 21 shows "1" while the output level of the inverter 22 shows "0". Therefore, the output of the AND gate 24 indicates "1" and the outputs of the AND gates 23, 25 and 26 all indicate "0". As a result, the output signal of the flip-flop 28 becomes a high level pulse indicating "1" as shown in FIG. 9(k) in synchronism with the clock pulse while the output levels of the flip-flops 27, 29 and 30 remain a low level indicating "0". The output pulse of the flip-flop 28 is supplied to the pulse-width controller 5b. At the second "1" in the two consecutive ones in the secondary-modulated data train, since the group code MSB is "1" and the group code LSB is "0", the output level of the inverter 21 shows "0" while the output level of the inverter 22 shows "1". Therefore, the output of the AND gate 25 indicates "1" and the outputs of the AND gates 23, 24 and 26 all indicate "0". As a result, the output level of the flip-flop 29 becomes a high level indicating "1" as shown in FIG. 9(l) in synchronism with the clock pulse while the output levels of the flip-flops 27, 28 and 30 remain a low level indicating "0". The output pulse of the flip-flop 29 is supplied to the pulse-width controller 5c.

When the secondary-modulated data train for the pattern 5T is supplied to the pulse distributor 4, it is a combination of the aforementioned secondary-modulated data train for the pattern 3T and the secondary-modulated data train for the pattern 2T. Therefore, the output signal of the flip-flop 28 becomes a high level pulse indicating "1" as shown in FIG. 9(k) in the first clock period when the secondary-modulated data train for the pattern 5T is supplied, the output signal of the flip-flop 29 becomes a high level pulse indicating "1" as shown in FIG. 9(l) in the second clock period, the output levels of the flip-flops 27 to 30 become a low level in the third clock period, the output level of the flip-flop 27 becomes a high level indicating "1" as shown in FIG. 9(j) in the fourth clock period, and the output levels of the flip-flops 27 to 30 become a low level in the fifth clock period.

When the secondary-modulated data train for the pattern 7T is supplied to the pulse distributor 4, it is a combination of the aforementioned secondary-modulated data train for the pattern 2T and the secondary-modulated data train for the pattern 5T. Therefore, the output levels of the flip-flops 27 to 30 vary as shown in FIG. 9(j) to FIG. 9(m). As the rise timing of the D inputs of the flip-flops 27 to 30 matches with that of the clock pulse, the output pulses of the flip-flops 27 to 30 shown in FIG. 9(j) to FIG. 9(m) are actually output with a delay of one clock.

Figure 10:
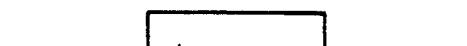
FIG. 10 is a chart showing the operational waveforms of individual sections in the pulse-width controller.
Figure 10:
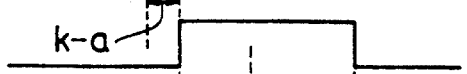
Figure 10:
Figure 10:
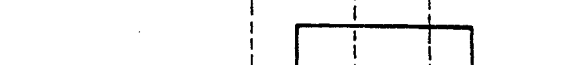
Figure 10:
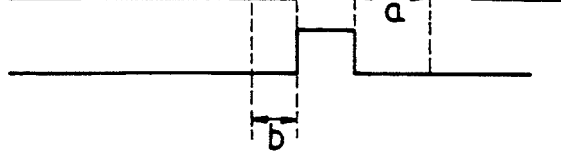

The pulse-width controllers 5a to 5d delay the output pulses of the flip-flops 27 to 30 to reduce the pulse widths. This process is described below with reference to the case where the pulse from the flip-flop 27 is supplied to the pulse-width controller 5a as shown in FIG. 10(A). The pulse is delayed first by K-a sec by the delay circuit 31 to be a first delay pulse as shown in FIG. 10(B). The first delay pulse is supplied to the delay circuit 32 and AND gate 34. The delay circuit 32 delays the first delay pulse by a sec to produce a second delay pulse as shown in FIG. 10(C). The second delay pulse is supplied to the delay circuit 33 to be further delayed by b sec to become a third delay pulse as shown in FIG. 10(D). The third delay pulse is supplied to the AND gate 34 which provides a logical product of the first and third delay pulses. A pulse having the leading edge cut off by b sec and the trailing edge cut off by a sec, as shown in FIG. 10(E), is output from the AND gate 34 after K+b sec from the reception of the input pulse. The pulse-width controllers 5b to 5d operate similarly. The output pulses of the pulse-width controllers 5a to 5d are supplied as a write signal to the laser driver 7 via the OR gate 6, and the write signal is written as a mark on the disk 9.

In case of a NRZI data train as shown in FIG. 11(a), the write signal that is output from the OR gate 6 via the secondary modulator 3, pulse distributor 4 and pulse-width controllers 5a to 5d becomes a train of pulses as shown in FIG. 11(b). In FIG. 11(b), (0) to (2) indicate group numbers. A signal read by a pickup 8 from the disk 9 on which the write signal thus produced has been recorded as a mark, has a waveform as shown in FIG. 11(c). When the level of the read signal is equal to or above the slice level, it corresponds to "1". A train of read data acquired in synchronism with a reproduction clock (FIG. 11(d)) becomes as shown in FIG. 11(e). It is apparent that the train of read data matches with the train of NRZI data shown in FIG. 11(a) for any of the patterns 2T to 8T.

The relationship between inputs and outputs determined by the individual conversion tables in the secondary-modulated data converter 12, group code MSB generator 13 and group code LSB generator 14 to which the NRZI data train is supplied, may be modified as shown in FIG. 12.

While (1, 7) RLL modulation has been explained as a specific example of the RLL modulation in the foregoing description of this embodiment, the RLL modulation is not limited to this type and may have values of (d, k) different from (1, 7).

In short, the secondary modulation method of the present invention replaces any bit excluding the leading bit of consecutive five or more ones in an odd-numbered bit pattern of a train of RLL-modulated data, with a zero to provide a modulated bit pattern having no consecutive zeros. It is therefore possible to form marks of a given width on a disk without any mark edge shift and without controlling the write laser power by writing secondary-modulated signals as the marks on the disk. What is more, this can be achieved with a simple circuit arrangement. Further, the level of the waveform of a signal read from the disk can be prevented from falling below the slice level at the position where the waveform of the read signal should show "1", thus ensuring the proper data reproduction.

What is claimed is:

1. A secondary modulation method of performing secondary modulation on a train of data carried out with run length limited modulation to be recorded on a recording medium, said method comprising a step of:
    replacing any bit excluding a leading bit of consecutive five or more ones in a bit pattern of said train of data, with a zero to provide a modulated bit pattern having no consecutive zeros, when said train of data has an odd-numbered bit pattern.

2. The method according to claim 1, wherein a bit width of at least consecutive bits of ones in a train of data after modulation to have a bit pattern with no consecutive zeros is made narrower.

* * * * *